United States Patent
Hsieh et al.

(10) Patent No.: US 7,934,855 B2
(45) Date of Patent: May 3, 2011

(54) FLAT LIGHT-EMITTING APPARATUS

(75) Inventors: Min-Hsun Hsieh, Hsinchu (TW);
Chien-Wuan Wang, Hsinchu (TW)

(73) Assignee: Epistar Corporation, Hsinchu (TW)

( * ) Notice: Subject to any disclaimer, the term of this patent is extended or adjusted under 35 U.S.C. 154(b) by 215 days.

(21) Appl. No.: 11/582,330

(22) Filed: Oct. 18, 2006

(65) Prior Publication Data
US 2007/0091599 A1    Apr. 26, 2007

(30) Foreign Application Priority Data
Oct. 26, 2005    (TW) ............................ 94137515 A

(51) Int. Cl.
*F21V 9/00*    (2006.01)
(52) U.S. Cl. ......... 362/293; 362/230; 362/231; 313/501
(58) Field of Classification Search .................. 362/293, 362/230, 231, 19, 555, 561, 260, 583, 510, 362/166, 84; 313/498, 501
See application file for complete search history.

(56) References Cited

U.S. PATENT DOCUMENTS

| | | | |
|---|---|---|---|
| 6,249,372 B1 * | 6/2001 | Kobayashi et al. | 359/326 |
| 6,590,333 B1 | 7/2003 | Suzuki et al. | |
| 6,844,670 B2 * | 1/2005 | Kuma et al. | 313/501 |
| 7,158,157 B2 * | 1/2007 | Yamazaki et al. | 345/691 |
| 2002/0011971 A1 | 1/2002 | Hamamoto et al. | |
| 2004/0252509 A1 * | 12/2004 | Lin | 362/293 |
| 2005/0116619 A1 * | 6/2005 | Kuma et al. | 313/503 |
| 2005/0116621 A1 * | 6/2005 | Bellmann et al. | 313/503 |
| 2005/0161690 A1 * | 7/2005 | Lai et al. | 257/98 |
| 2005/0174048 A1 * | 8/2005 | Matsukaze | 313/506 |
| 2005/0189857 A1 * | 9/2005 | Kobori | 313/110 |
| 2006/0012296 A1 * | 1/2006 | Eida et al. | 313/509 |
| 2006/0033860 A1 * | 2/2006 | Okishiro et al. | 349/70 |
| 2006/0158090 A1 * | 7/2006 | Wang et al. | 313/485 |
| 2007/0047261 A1 * | 3/2007 | Thompson et al. | 362/623 |

FOREIGN PATENT DOCUMENTS

| | | |
|---|---|---|
| KR | 2001-0050585 | 6/2001 |
| KR | 2002-0010485 | 2/2002 |

* cited by examiner

*Primary Examiner* — Evan Dzierzynski
(74) *Attorney, Agent, or Firm* — Bacon & Thomas, PLLC

(57) ABSTRACT

A flat light-emitting apparatus includes a light-emitting element for radiating visible light consisting of a first-wavelength light with a wavelength substantially not less than 600 nm and a second-wavelength light with a wavelength substantially not greater than 480 nm, a wavelength conversion material for generating a third-wavelength light when irradiated by the second-wavelength light, a first color filter for the passing of the first-wavelength light, a second color filter for the passing of the second-wavelength light, and a third color filter for the passing of the third-wavelength light.

14 Claims, 1 Drawing Sheet

FLAT LIGHT-EMITTING APPARATUS

REFERENCE TO RELATED APPLICATION

This application claims the right of priority based on TW application Ser. No. 094137515, filed "Oct. 26, 2005", entitled Flat Light-emitting Apparatus and the contents of which are incorporated herein by reference.

TECHNICAL FIELD

This invention relates to a flat light-emitting apparatus, and more particularly to a flat panel display capable of generating green light by making blue light pass through a phosphor and a green color filter.

BACKGROUND OF THE INVENTION

TFT Liquid Crystal Displays are widely applied to different products such as handset apparatus, notebooks, monitors and flat TVs on the strength of their characteristics including thinner, lighter in weight, and lower power consumption in comparison with traditional CRTs (Cathode Ray Tubes).

A TFT Liquid Crystal Display comprises a backlight module and an LCD module. The light emitted from the backlight module passes through the LCD module and is converted into a plurality of different color lights for image display. The LCD module includes a first polarizer, a first glass substrate, a color filter, a liquid crystal layer, a second glass substrate, and a second polarizer, wherein the first polarizer and the second polarizer are perpendicular to each other. First, the light emitted from the backlight module is polarized by the first polarizer and gets into the liquid crystal layer. Then, the light is twisted by the liquid crystal layer according to the strength of the electrical field between the two glass substrates for controlling the amount of light passing through the LCD module. Finally, the light is filtered by the color filter composed of a plurality of red, green, and blue sub-pixel color filters for generating the different color lights.

The backlight module includes a light-emitting element, a plurality of optical films, and optionally a light guide plate. The light-emitting element is typically a cold cathode fluorescent lamp ("CCFL") device, a combination of a blue light-emitting diode ("LED") and a fluorescent material like YAG, or a combination of a red, a blue, and a green LEDs for providing white light to travel through the LCD module. The optical films include several prism sheets and a diffuser for increasing the light efficiency and uniformity; the light guide plate is a transparent body for guiding the light emitted from light-emitting element to a desired direction. As to those typical light-emitting elements, there are several disadvantages such as low color saturation and low light efficiency depending on the different light sources and the combinations.

SUMMARY OF THE INVENTION

The present invention provides a flat light-emitting apparatus that includes a light-emitting element for radiating visible light consisting of a first-wavelength light with a wavelength substantially not less than 600 nm, and a second-wavelength light with a wavelength substantially not greater than 480 nm; a wavelength conversion material for generating a third-wavelength light when irradiated by the second-wavelength light; a first color filter for the passing of the first-wavelength light; a second color filter for the passing of the second-wavelength light; and a third color filter for the passing of the third-wavelength light. Moreover, the flat light-emitting apparatus further comprises a plurality of optical films and a liquid crystal layer deposited between the filters and the light-emitting element.

An object of the present invention is to provide a flat panel display capable of generating green light by making blue light pass through a phosphor and a green color filter.

Another object of the present invention is to provide a flat panel display having filtering apparatus, which is a combination of a wavelength conversion material and a color filter for generating colored light. The advantage of the present invention is to increase the light efficiency of a flat panel display such as TFT-LCD.

DETAILED DESCRIPTION OF A PREFERRED EMBODIMENT

Figure 1:
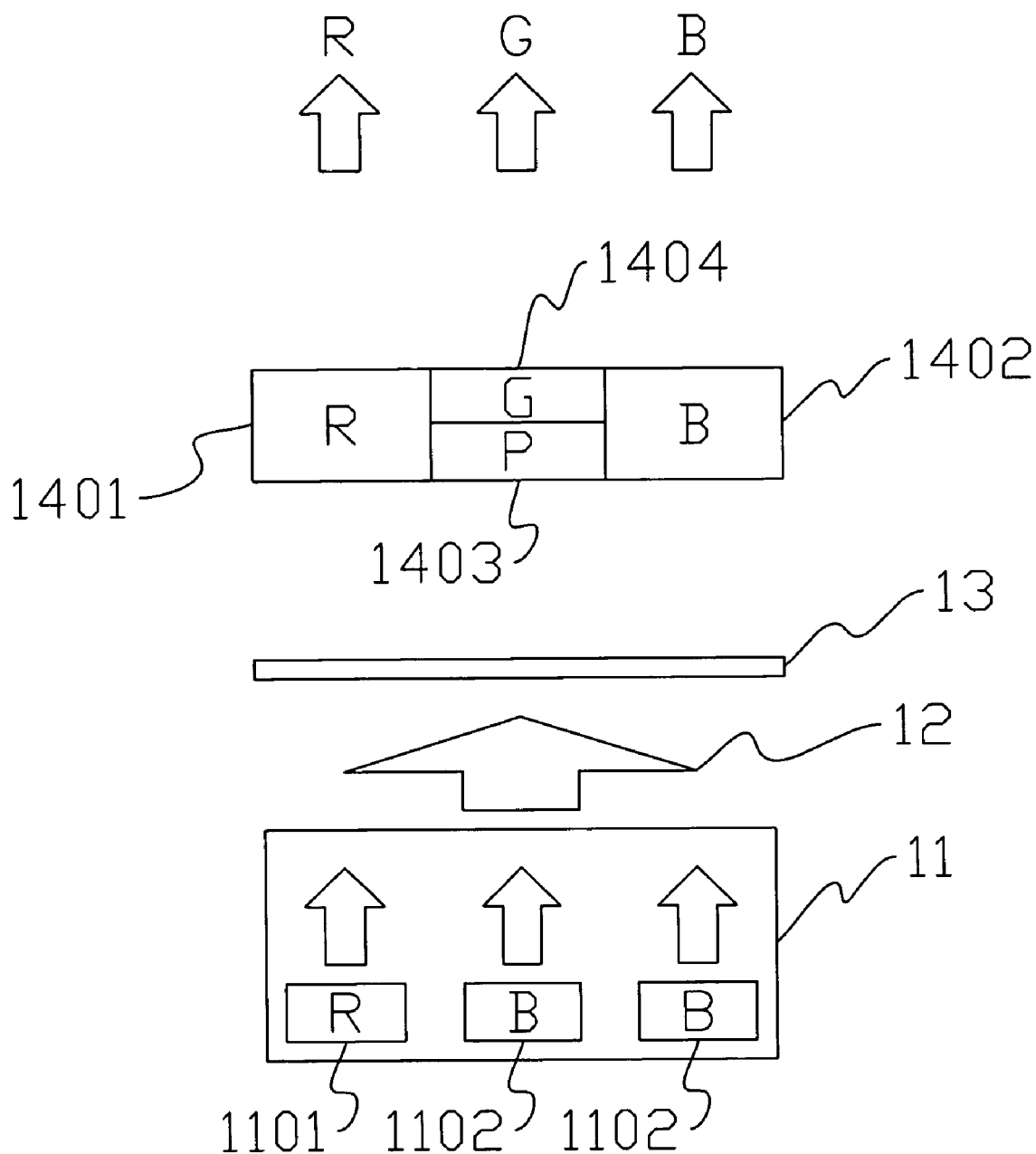
FIG. 1 shows a flat light-emitting apparatus of the present invention.

Referring to the FIG. 1, an embodiment of the present invention will be described below. A flat light-emitting apparatus 10 comprises an LCD module (not shown) with a liquid crystal layer 13 and a backlight module (not shown) with a light-emitting element 11. Typically, there are two types of the backlight modules. One is the bottom lighting type, and the other is the edge lighting type. The bottom lighting type backlight module is located below the LCD module and is composed of a diffuser and several optical films. The edge lighting type backlight module is located at one side of the LCD module and is composed of a diffuser, several optical films, and a light guide plate for leading a light emitted form the light-emitting element 11 to the LCD module.

The light-emitting element 11 includes a red light-emitting component 1101 with a wavelength substantially not less than 600 nm, preferably between 610 nm~710 nm, and a blue light-emitting component 1102 with a wavelength substantially not greater than 480 nm, preferably between 440 nm~470 nm. The light-emitting components 1101 and 1102 are LEDs, incandescent light bulbs, or CCFLs. The number of the light-emitting components 1101 and 1102 depends on the optical characteristics of the flat light-emitting apparatus 10. The arrangement of the light-emitting components 1101 and 1102 can be linear, curve, or cluster, wherein the linear arrangement means the light-emitting components are arranged in a line; the curve arrangement means the light-emitting components are arranged in a curve; the cluster arrangement means the light-emitting components are arranged in a circle shape, a star shape, a rectangular shape, or a radiation shape.

The light emitted from the red light-emitting component 1101 and the light emitted from the blue light-emitting component 1102 form a mixed light 12. The mixed light 12 is polarized by a polarizer (not shown) and then travels to the liquid crystal layer 13. Whether or not the light passes the liquid crystal layer 13 is determined by the twist angle of the liquid crystal molecules of the liquid crystal layer 13 which is controlled by the strength of the electrical field that is applied across the liquid crystal layer 13.

A part of the light passes through the red filter 1401 for transmitting the red light and filtering out the blue light. Another part of the light passes through the blue filter 1402 for transmitting the blue light and filtering out the red light. The wavelength conversion material 1403 is irradiated by the blue light to generate a green light. The green color filter 1404 allows the pass of the green light generated by the wavelength conversion material 1403 and filters out the non-green light, especially the non-green light that passes through the color conversion material 1403. The combination structure of the wavelength conversion material 1403 and the green color filter 1404 generates pure green light. Theoretically, with the preferred embodiment, five-ninths of the light generated from the red light-emitting element 1101 and blue light-emitting element 1102 is useful. Therefore the light efficiency of the flat light-emitting apparatus 10 in accordance with the preferred embodiment of present invention is higher than that of a conventional LCD.

The wavelength conversion material 1403 is blended with polymer resin and deposited on a desired position. The wavelength conversion material 1403 comprises at least one fluorescent material selected from the group consisting of $(Sr, Ba)_2SiO_4:Eu^{2+}$; $SrGa_2S_4:Eu^{2+}$; $Y_2SiO_5:Tb$; $CeMgAl_{11}O_{19}:Tb$; $Zn_2SiO_4:Mn$; $LaPo_4:Ce, Tb$; $Y_3Al_5O_{12}:Tb$; $Y_2O_2S:Tb, Dy$; $BaMgAl_{11}O_{17}:Eu, Mn$; $GdMgZnB_5O_{10}:Ce, Tb$; and $Gd_2O_2S:Tb$, or is a phosphor, such as of G450 series, available from Internatix (a U.S. company).

A red Distributed Bragg Reflector (DBR) layer (not shown) is optionally formed between the light-emitting element 11 and the blue color filter 1402 and/or between the light-emitting element 11 and the wavelength conversion material 1403 for reflecting red light. A blue Distributed Bragg Reflector (DBR) layer (not shown) is formed between the light-emitting element 11 and the red color filter 1402 for reflecting blue light. The red DBR layer prevents the blue color filter 1402 or the wavelength conversion material 1403 from absorbing or filtering red light, and the blue DBR layer prevents the red color filter 1402 from absorbing or filtering blue light. Thereby, the light generated from the light-emitting components 1101 and 1102 can be exploited with higher efficiency.

The foregoing description has been directed to a specific embodiment of this invention. It will be apparent; however, that other variations and modifications may be made to the described embodiments, with the attainment of some or all of their advantages. Therefore, it is the object of the appended claims to cover all such variations and modifications that fall within the spirit and scope of the invention.

What is claimed is:

1. A flat light-emitting apparatus comprising:
    a plurality of light-emitting diodes for generating mixed light including a first-wavelength light with a wavelength substantially not less than 600 nm and a second-wavelength light with a wavelength substantially not greater than 480 nm, wherein said mixed light is devoid of a third-wavelength light, and the third wavelength light is green light;
    a wavelength conversion material for generating said third-wavelength light when irradiated by said second-wavelength light included in said mixed light;
    a first color filter for the passing of said first-wavelength light included in said mixed light;
    a second color filter for the passing of said second-wavelength light included in said mixed light; and
    a third color filter for the passing of said third-wavelength light and in combination with the wavelength conversion material,
    wherein the first color filter, the second color filter, and the third color filter are integral and separate the first-wavelength light and the second-wavelength light from the mixed light;
    wherein the amount of the second-wavelength light included in said mixed light is decreased after the third-wavelength light is produced.

2. A flat light-emitting apparatus according to claim 1, further comprising:
    a liquid crystal layer located between said color filters and said light-emitting element; and
    a plurality of optical films including a polarizer substantially parallel to said liquid crystal layer.

3. A flat light-emitting apparatus according to claim 1, wherein said first wavelength light is radiated from a red light-emitting diode.

4. A flat light-emitting apparatus according to claim 1, wherein said second wavelength light is radiated from a blue light-emitting diode.

5. A flat light-emitting apparatus according to claim 1, wherein said wavelength conversion material is adjacent to said third color filter.

6. A flat light-emitting apparatus according to claim 1, wherein said wavelength conversion material includes a fluorescent material.

7. A flat light-emitting apparatus according to claim 1, wherein said wavelength conversion material includes at least one of a silicate fluorescent material, a borate fluorescent material, or an oxide fluorescent material.

8. A flat light-emitting apparatus according to claim 1, wherein said wavelength conversion material includes at least one of $(Sr,Ba)_2SiO_4:Eu^{2+}$; $SrGa_2S_4:Eu^{2+}$; $Y_2SiO_5:Tb$; $CeMgAl_{11}O_{19}:Tb$; $Zn_2SiO_4:Mn$; $LaPo_4:Ce, Tb$; $Y_3Al_5O_{12}:Tb$; $Y_2O_2S:Tb, Dy$; $BaMgAl_{11}O_{17}:Eu,Mn$; $GdMgZnB_5O_{10}:Ce, Tb$; and $Gd_2O_2S:Tb$.

9. A flat light-emitting apparatus according to claim 1, further comprising a Distributed Bragg Reflector (DBR) located between said light-emitting diodes and at least one of said wavelength conversion material, said first color filter, said second color filter, and said third color filter.

10. A flat light-emitting apparatus according to claim 1, wherein said light-emitting diodes are arranged in a line, a curve, or a cluster.

11. A flat light-emitting apparatus according to claim 1, wherein said third color filter is thinner than the first color filter.

12. A flat light-emitting apparatus according to claim 1, wherein said mixed light is separated into red and blue light and part of said blue light is converted to green light only after passing through said color filters.

13. A flat light-emitting apparatus comprising:
    a plurality of light-emitting diodes for generating mixed light including a first-wavelength light with a wavelength substantially not less than 600 nm and a second-wavelength light with a wavelength substantially not greater than 480 nm, wherein said mixed light is devoid of a third-wavelength light;
    a wavelength conversion material for generating said third-wavelength light when irradiated by said second-wavelength light;
    a first color filter for the passing of said first-wavelength light;
    a second color filter for the passing of said second-wavelength light; and
    a third color filter for the passing of said third-wavelength light and in combination with the wavelength conversion material,
    wherein an intensity of the first-wavelength light is less than that of the second-wavelength light.

14. A flat light-emitting apparatus according to claim 13, wherein said mixed light is separated into red and blue light and part of said blue light is converted to green light only after passing through said color filters.

* * * * *